United States Patent [19]

Bridges

[11] Patent Number: 4,775,161
[45] Date of Patent: Oct. 4, 1988

[54] TILT STEERED SLEDS

[76] Inventor: Paul D. Bridges, 703 Houston St., Batavia, Ill. 60510

[21] Appl. No.: 810,395

[22] Filed: Dec. 17, 1985

[51] Int. Cl.⁴ .............................................. B62B 13/02
[52] U.S. Cl. .................................... 280/16; 280/21 R
[58] Field of Search ............... 280/21 A, 21 R, 16, 280/17, 12 KL, 11.28, 281 LP

[56] References Cited

U.S. PATENT DOCUMENTS

| | | | |
|---|---|---|---|
| 3,014,731 | 12/1961 | Dworak | 280/16 |
| 4,180,278 | 12/1979 | Gottlieb | 280/11.28 |
| 4,432,561 | 2/1984 | Feikema | 280/281 LP |

FOREIGN PATENT DOCUMENTS

| | | | |
|---|---|---|---|
| 2059402 | 6/1972 | Fed. Rep. of Germany | 280/16 |
| 2720934 | 11/1978 | Fed. Rep. of Germany | 280/16 |
| 452362 | 5/1968 | Switzerland | 280/21 R |

*Primary Examiner*—David M. Mitchell
*Attorney, Agent, or Firm*—Hill, Van Santen, Steadman & Simpson

[57] ABSTRACT

A sled which is steerable by shifting the weight of the rider includes one front and two rear skis. The seat frame is connected to the rear skis by an inclined sleeve which translates rotational movement of the seat frame about a generally longitudinal axis to turning movement of the rear skis about a generally vertical axis.

1 Claim, 1 Drawing Sheet

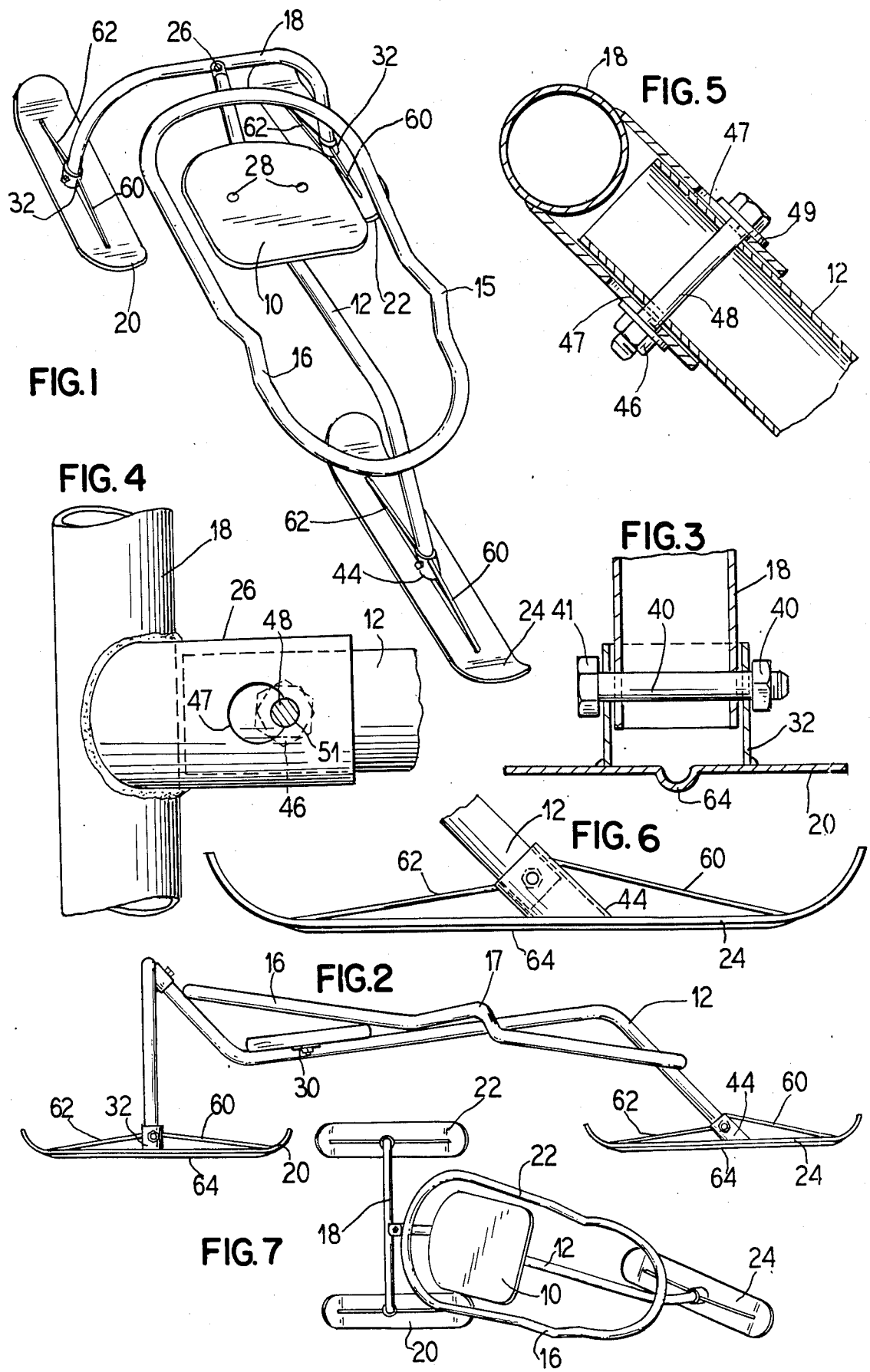

TILT STEERED SLEDS

BACKGROUND

1. Field of the Invention

The present invention relates to a vehicle supported on runners and more particularly to a sled.

2. Prior Art

A variety of different forms of sleds have been devised in the past, but generally they are provided with fixed runners with no capacity for steering the direction in which the sled moves. This is the case when the sled is adapted to be pulled by a rope or the like so that the direction of travel of the sled is controlled entirely by the direction in which it is pulled.

This is also true for most gravity powered sleds, which are adapted to run downhill without being pulled. In some cases the sled runners are somewhat flexible so that they can be moved or adjusted slightly to allow a very limited amount of steering. With this limited amount of control, the gravity powered sleds are generally restricted to traveling in a direction which is very close to the fall line, i.e., the line along which a ball moving at the speed of the sled would roll downhill.

It is desirable to provide a simple and effective apparatus for steering a gravity powered sled, so that it can be steered through a wide angle departing greatly from the fall line direction.

BRIEF DESCRIPTION OF THE INVENTION

It is a principal object of the present invention to provide simple and effective steering means for steering a gravity powered sled.

Another object of the present invention is to provide a mechanism by which a gravity powered sled may be steered by shifting the weight of the rider.

Another object of the present invention is to provide a gravity powered sled with apparatus for effectively steering it, with a minimum of moving parts, and using a design which is simple and economical to manufacture.

In accordance with one embodiment of the present invention, there is provided a gravity powered sled having a seat for a rider supported on a seat frame, and a plurality of runners for supporting the frame on the ground. A simple coupling is interconnected between a rear frame member and the seat frame, whereby shifting the attitude of the seat frame as a result of shifting the weight of the rider brings about a change in the angle of attack of the rear skis relative to the center line of the vehicle. The shifting of the seat frame also causes a forward ski to be also turned and edged on the surface of the snow, or other supporting surface.

These and other objects and advantages of the present invention will become manifest by a review of the following description and inspection of the accompanying drawings.

BRIEF DESCRIPTION OF THE DRAWINGS

Reference will now be made to the accompanying drawings in which:

FIG. 1 is a perspective view of a sled embodying an illustrative embodiment of the present invention;

FIG. 2 is a side elevational view of the sled of FIG. 1;

FIG. 3 is a vertical cross-sectional view of a portion of the sled of FIG. 2, taken in the section line III—III;

FIG. 4 is a fragmentary view showing the coupling interconnecting the seat frame and the rear frame;

FIG. 5 is a cross-sectional view of the apparatus of FIG. 4, taken in the section line V—V;

FIG. 6 is a vertical cross-sectional view of a fragment of the sled of FIG. 2, showing the connection between the seat frame and the forward ski; and FIG. 7 is a plan view of the sled of FIGS. 1 and 2 showing the sled in a right-turn configuration.

DESCRIPTION OF THE PREFERRED EMBODIMENT

Referring now to FIG. 1, a sled incorporating the present invention has a seat 10 mounted on a seat frame comprising tubes 12, 14 and 16, which are fixed together by welding or the like, and a a rear frame 18 interconnected between two rear skis 20 and 22. A forward ski 24 is connected to the front end of the seat frame tube 12. A coupler sleeve 26 interconnects the rear frame 18 with the seat frame tube 12. The seat 10 is rigidly connected to the frame tube 12 by means of a pair of rivets 28 and a connecting member 30 which is secured to the frame tube 12 below the seat 10.

The seat frame tubes 14 and 16 are preferably provided with hoop portions 15 and 17, respectively, to provide places for the rider to grasp, and to protect the rider's fingers by locating them above the lower surfaces of the tubes 14 and 16.

Each of the rear skis is connected to the rear frame member 18 in the manner illustrated in cross-section of FIG. 3. A circular cup member 32 is secured to the upper surface of the ski 20 by welding or the like. The end of the rear frame 18 is received within the cup 32. A bolt 40 with an enlarged head 41 passes through aligned apertures in the cup 32 and the end portion of the rear frame 18, and a lock nut 42 is threaded on the bolt 40 to hold the parts in assembled relation. The cup 32 is round and is dimensioned with an inner diameter slightly larger than the outer diameter of the frame member 18, so that as the nut 42 is tightened on the bolt 40, the side walls of the cup 32 are squeezed inwardly until they just touch the exterior surface of the frame member 18. Thus, the ski 20 is held in lateral position relative to the frame 18. The ski 20 is free to rotate about the axis of the shaft 40, with a limited degree of motion, which is limited by the rear frame 18 engaging the end of the cup 32. This allows a pivoting action of the rear skis 20 and 22 to enable them to follow variations in terrain as the sled moves over the surface of the ground.

A similar connected is illustrated in FIG. 6 for the front ski 24. In this case however the cup 44, which is secured to the upper surface of the ski 24 by welding or the like is angled relative to the plane of the ski 24, to better accommodate the angled end of the frame tube 12. The forward end of the frame tube 12 is pivotally mounted within the cup 44, by use of a nut and bolt, just as in the arrangement of FIG. 3.

The open ends of the cups 32 and 44 may be left open if convenient, or covered with a flexible material which will permit pivoting of the skis relative to their respective frames, without any danger of an operator or rider having his finger pinched between the moving parts.

The sleeve 26 between the seat frame tube 12 and the rear frame 18 is welded or otherwise secured to the rear frame 18 at an angle to the horizontal. The sleeve 26 is hollow and has an inside dimension which allows the rear end of the frame tube 12 to snuggly fit inside it, but with a small amount of rotation and translation permitted between the parts. A bolt 48 passes through aligned apertures in the top and bottom of the frame tube 12 sized to just receive the bolt. This bolt also passes through aligned apertures 47 in the sleeve 26, which are larger than the diameter of the bolt 48, to allow relative motion between the parts. The bolt 48 has a lock nut threaded onto its free end to hold the parts in assembled relation. If desired, a pair of washers such as the washer 49 (FIG. 5) are provided between the tube 12 and the nut 46 and the head of the bolt 48. Preferably a notch, with about the same radius as the bolt 48 is provided at the forward side of the aperture 47. The normal straight-running configuration of the sled is that shown in FIG. 4, with the bolt 48 located at the forward (and downward) side of the aperture 47, at the notch 51. The notch 51 serves as a detent to allow the straight-running configuration to be resumed easily, but even when the notch 51 is omitted, the force of gravity tends to locate the bolt 48 at the forward (and downward) side of the aperture 47. The bolt 48 not only prevents the frame tube 12 from moving further into the sleeve 26 than as shown in FIG. 4, but also limits the amount of rotation that the frame tube 12 can have about its longitudinal dimension, relative to the sleeve 26. The result is an assembly which allows a limited amount of rotational movement of the frame tube 12 relative to the sleeve 26 and the rear frame 18, as determined by the dimensions of the apertures 47, but otherwise holds the parts in position relative to each other.

FIG. 7 illustrates the attitude of the seat frame when it has been tilted as if by the rider leaning to the right, to initiate and execute a right turn. Because of the angled sleeve 26 interconnecting the seat frame tube 12 with the rear frame 18, the longitudinal pivoting (or rolling) action of the seat frame is translated into a rotation about a vertical axis (or yaw) for the rear skis 20 and 22. Thus the rear skis, together with their connecting frame 18 have been turned in a manner as illustrated in FIG. 7, to allow the vehicle to execute a right turn. At the same time, the forward ski 24 has been rotated rightwardly and canted so that its right edge is lower than its left edge, which also assists in making a right turn. Thus the turning action is accomplished not only by rotation of the front and rear skis about a vertical axis (yaw), but also by a rotation (roll) about a longitudinal axis serving to edge the front ski. Thus results from the fact that both ends of the seat frame 12 are at an angle to the horizontal where they are pivotally connected respectively to the front ski and the rear frame.

The skis 20, 22 and 24 are preferably flexible to accommodate variations in contour of the terrain, while maintaining support of the weight of the vehicle over a large surface area of the snow. The flexibility of the front ski 24 also assists in turning by executing a carving action because of the curved or bowed shape of the front ski which results when the ends of the ski flex upwardly relative to the center portion, which supports the forward end of the seat frame tube 12.

If desired the front and rear skis can be made stiffer by providing struts 60 and 62 which are welded at one end to the top surface of the ski and at the other end to the cup 32 or 44. When the skis are thus stiffened, the skis 24 and 32 are held more nearly in a planar condition.

Preferably, the skis 20, 22 and 24 are each provided with a longitudinal ridge 64 in the central portion of its bottom surface, to assist in maintaining straight running of the skis during periods in which turning is not desired.

Preferably, the seat frame members 12, 14, 16 and the rear frame member 18 are formed of hollow metal tubes, to minimize the weight of the vehicle while assuring sufficient mechanical strength. Alternatively, if desired, these members may be formed of solid rod material. The seat 10 may be wood or plastic, and the skis 20, 22 and 24 may be metal or plastic. When the skis are formed of plastic, preferably the tubes 32 and 34, as well as the members 36 and 38 to which the frame members are pivoted, are formed integrally of plastic with the skis.

From the foregoing, it is apparent that the present invention provides a sled which is easily steerable merely by the rider shifting weight from one side to the other. Because there is effective simultaneous steering of the front and rear skis, a small angle of rotation of the seat frame results in a rapid turning action. Oversteering is prevented by sizing the aperture 47 so as to prevent rotation of the seat frame by more than a limited range of movement.

It is apparent that various additions and modifications may be made in the sled of the present invention without departing from the essential features of novelty thereof, which are intended to be defined and secured by the appended claims.

What is claimed is:

1. A steerable sled comprising a seat frame for supporting a seat for a rider, means for supporting said seat frame on front and rear skis, and a connector for interconnecting said seat frame with one of said skis for turning said one ski relative to said sled in response to rolling of said seat frame by shifting the weight of a rider of said sled on said seat, said connector comprising a sleeve surrounding a portion of said seat frame for allowing limited rotational movement relative thereof, said sleeve being connected to one ski and being disposed at an angle relative to the horizontal, whereby rotation of said seat frame brings about rotation of said one ski about a vertical axis, said sleeve being provided with an aperture aligned with an aperture in said seat frame, and including a shaft extending through said aligned apertures, one of said apertures having a size larger than the size of said shaft to allow a limited range of relative movement between said seat frame and said sleeve, and including a notch at the side of one of said apertures which is in engagement with said shaft during straight running operation of said sled, to serve as a detent for relative rotation between said sleeve and said frame.

* * * * *